United States Patent [19]
Maei et al.

[11] Patent Number: 5,657,136
[45] Date of Patent: Aug. 12, 1997

[54] FACSIMILE APPARATUS

[75] Inventors: Yoshihiro Maei; Takashi Sakayama; Yoshiaki Tezuka; Hiroaki Sakaki; Hideki Fujii, all of Iwatsuki, Japan

[73] Assignee: Fuji Xerox Co., Ltd., Tokyo, Japan

[21] Appl. No.: 418,217

[22] Filed: Apr. 6, 1995

[30] Foreign Application Priority Data

Jul. 29, 1994 [JP] Japan .................................. 6-196220

[51] Int. Cl.⁶ .......................... H04N 1/32; H04N 1/00
[52] U.S. Cl. .......................... 358/468; 358/434; 358/435; 379/100.14
[58] Field of Search .......................... 358/468, 434, 358/435, 436, 437, 438, 439, 440, 442; 379/100

[56] References Cited

U.S. PATENT DOCUMENTS

| | | | |
|---|---|---|---|
| 5,287,402 | 2/1994 | Nakajima | 358/434 |
| 5,329,580 | 7/1994 | Yoshino | 358/435 |
| 5,473,674 | 12/1995 | Maeda | 358/435 |
| 5,481,373 | 1/1996 | Ikeguchi et al. | 358/438 |

FOREIGN PATENT DOCUMENTS

| | | |
|---|---|---|
| 63-104572 | 5/1988 | Japan . |
| 63-300669 | 12/1988 | Japan . |
| 2-50560 | 2/1990 | Japan . |
| 3-260875 | 11/1991 | Japan . |
| 4-168862 | 6/1992 | Japan . |
| 4-326248 | 11/1992 | Japan . |

OTHER PUBLICATIONS

"Terminal Equipments and Protocols For Telematic Serivices", ITU–T Recommendation T.30, pp. 39 and 87 (1993).

*Primary Examiner*—Thomas D. Lee
*Attorney, Agent, or Firm*—Finnegan, Henderson, Farabow, Garrett & Dunner, L.L.P.

[57] ABSTRACT

A facsimile apparatus is disclosed which comprises code input means (20) for inputting codes for dialing, such as 0–9, #, and *, and predetermined codes (for example, "!") other than the codes for dialing, code storage means (21) for storing a train of codes, control means (22) for reading the codes one by one and outputting, when the read code is other than a predetermined code, the code as it is, and waiting, when the code is a predetermined code, outputting of the following signal until a predetermined signal from the apparatus on the other end of the line is received, dial signal transmission means (23) for transmitting signals over the line according to output codes from the control means, and signal monitor means (24) for monitoring received signals from the apparatus on the other end of the line for a predetermined signal. By the apparatus, controlling of various facsimile applications with the use of DTMF signals can be made possible.

5 Claims, 8 Drawing Sheets

FACSIMILE APPARATUS

BACKGROUND OF THE INVENTION

1. Field of the Invention

The present invention relates to a facsimile apparatus and, more particularly, to a facsimile apparatus having the ability to transmit command signals in the form of a multifrequency signal using an automatic dialing function.

2. Description of the Related Art

The so-called G3 procedure standardized according to ITU-T Recommendation T.30 is widely in use for facsimile communication. Further, there are defined such signals as NSF (Non-Standard Facilities), NSC (Non-Standard facilities Command), and NSS (Non-Standard facilities Set-up) for conducting negotiations for functions not included in the standard procedure. However, since these signals are substantiated in the format or code particular to each manufacturer, negotiations between apparatuses of different manufacturers have been unattainable.

On the other hand, there are proposed facsimile systems which are equipped to transmit and receive DTMF (dual tone multifrequency) signal, i.e., the PB (push button) signal, and to execute communication control with using DTMF signal (refer to gazettes of Japanese Patent Laid-open Nos. Sho 63-104572, Sho 63-300669, Hei 2-50560, Hei 3-260875). A telephone is used as the apparatus on the side transmitting the DTMF signal in some of the related art examples, but no disclosure of it is made in the others. Thus, there has been no reference in which investigation of the method of signal detection and the method of signal transmission is made in concrete terms, and the DTMF signal has generally been described as such that is transmitted manually. Under these circumstances, there is proposed an art to have the DTMF signal transmitted automatically (refer to the gazette of Japanese Patent Laid-open No. Hei 4-168862).

Further, a system in which dial pulses are switched to DTMF signals is disclosed in the gazette of Japanese Patent Laid-open No. Hei 4-326248. In this related art example, use of the DTMF signal for starting up a facsimile application is disclosed. However, details of the protocol control are not disclosed.

To control a facsimile application using DTMF signal, it is necessary to transmit the signal at the timing that allows the apparatus on the other end of the line to correctly receive the signal. It is also necessary to confirm that the signal is correctly received by the apparatus on the other end. Considering, for example, the automatic dialing function, an existing facsimile apparatus must be matched with the apparatus on the other end. There has therefore been a problem with the above related art facsimile systems that no concrete description exists of a design having the signal receiving function on the receiving side or matching with the existing function on the transmitting side taken into consideration to thereby achieve automatic transmission of the DTMF signals.

SUMMARY OF THE INVENTION

Accordingly, it is an object of the present invention to provide a facsimile apparatus in which the above mentioned problem is overcome and various facsimile applications using DTMF signals are made controllable.

A first aspect of the invention is a code input means for inputting codes for dialing and predetermined codes other than the codes for dialing, code storage means for storing an input train of codes, signal monitor means for monitoring received signals from the apparatus on the other end of the line for a predetermined signal, control means for reading the code from the code storage means and outputting, when the read code is other than a predetermined code, the read code and waiting. When the read code is a predetermined code, outputting of the following signal until the signal monitor means detects a predetermined signal input from the apparatus on the other end of the line. The invention also includes signal transmission means for transmitting signals over the line according to output codes from the control means.

A second aspect of the invention is a kind-of-line designation means for designating the kind of dial signal used on the line. In addition to the first aspect of the invention, the signal transmission means transmits signals in the signal form designated by the kind-of-line designation means until the predetermined code is read and transmits signals in a multifrequency signal form after the predetermined code has been read. A third aspect of the invention is an off-hook detection means in addition to the first or second aspect of the invention, in which the control means, under an off-hook condition, neglects the signals following the predetermined code. A fourth aspect of the invention is an off-hook detection means in addition to the first or second aspect of the invention, in which the control means, under an off-hook condition, takes the predetermined code to be an interrupt code to interrupt the operation for a predetermined period of time.

According to the first aspect of the invention, the control means, when it has read a predetermined code from the code storage means, suspends transmission of signals following the predetermined code until a predetermined signal is received from the apparatus on the other end of the line; therefore, it is possible to synchronize the timing of a transmitted train of codes with operations in the apparatus on the other end, and further it is possible to determine whether the apparatus on the other end is receiving the transmitted signal correctly according to receipt or nonreceipt of the signal from the apparatus on the other end. According to the second aspect of the invention, signals are first transmitted over the line in accordance with the kind of the dial signal designated by the kind-of-line designation means and, after the predetermined code has been read, signals are transmitted in the form of a multifrequency signal; therefore, automatic dialing and successive transmission of the multifrequency signal over the line supporting dial signaling, in any of such signals as DP (dial pulse), PB, and digital signals, can be executed with the same apparatus.

According to the third aspect of the invention, the control means, when an off-hook condition has been detected, neglects the codes following the predetermined code and performs no operation; therefore, transmission of unnecessary signals under the off-hook condition can be prevented. According to the fourth aspect of the invention, the control means, when a predetermined code is read under the off-hook condition, executes control such that the signal transmission means sends the following signal after waiting a predetermined period of time; therefore, signal transmission is made possible even under the off-hook condition.

DETAILED DESCRIPTION OF THE PREFERRED EMBODIMENTS

An embodiment of the present invention will be described with reference to the accompanying drawings.

Figure 2:
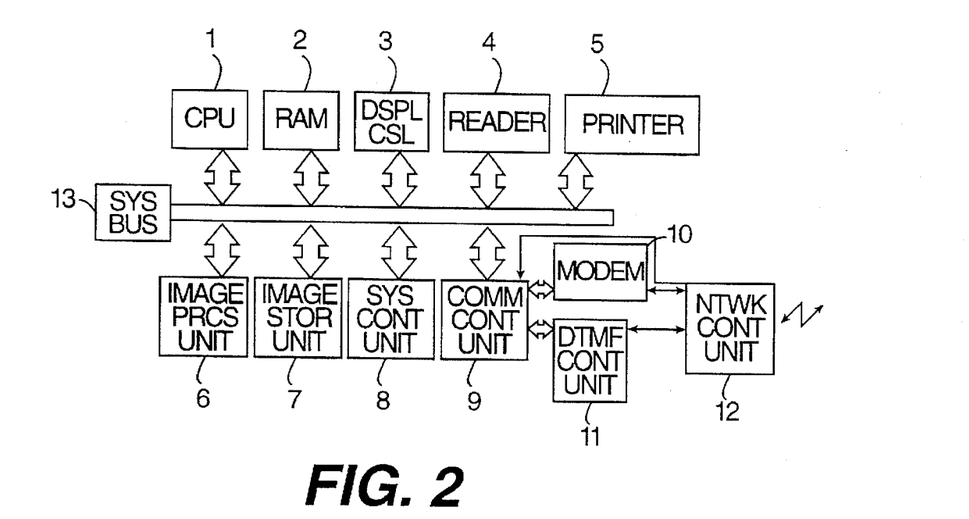
FIG. 2 is a block diagram showing structure of a facsimile apparatus.

FIG. 2 is a block diagram showing structure of an embodiment of a facsimile apparatus according to the present invention. A CPU 1 executes controlling processes for the entire facsimile apparatus and facsimile transmission controlling procedures. A RAM 2 is a memory used as a work area for controlling programs. A display console 3 has various switches for controlling the facsimile apparatus and a display device having an LCD, LEDs, or the like. A reader 4 is a device for reading a transmitted original document using for example a CCD image sensor. A printer 5 is a device for printing received image data and the like. An image processing unit 6 performs encoding and decoding (compression and decompression) between an image signal and transmitted codes. An image storing unit 7 is a storage device for storing image data. A system control unit 8 has a ROM storing programs for controlling the entire facsimile apparatus.

A communication control unit 9 has a facsimile communication control program of the type G3 or G4 and interface circuits with a modem 10, a DTMF control unit 11, and a network control unit 12. The modem 10 is a modulating and demodulating device equipped with a function of a low-speed modem (V21) for a transmission procedural signal and a function of a high-speed modem (V27ter, V29, V33, V17, or the like) for transmitting and receiving picture information. The DTMF control unit 11 transmits and receives the DTMF signal (PB signal) and commands in the DTMF signal and also is used at the time of dialing with a PB line. The need for the DTMF control unit 11 can be eliminated if the modem 10 transmits and receives the DTMF signal. The network control unit 12 is an interface circuit with the telephone network or the ISDN line and equipped with an automatic transmitting and receiving function. A system bus 13 is for transferring data between various circuits within the apparatus.

Figure 3:
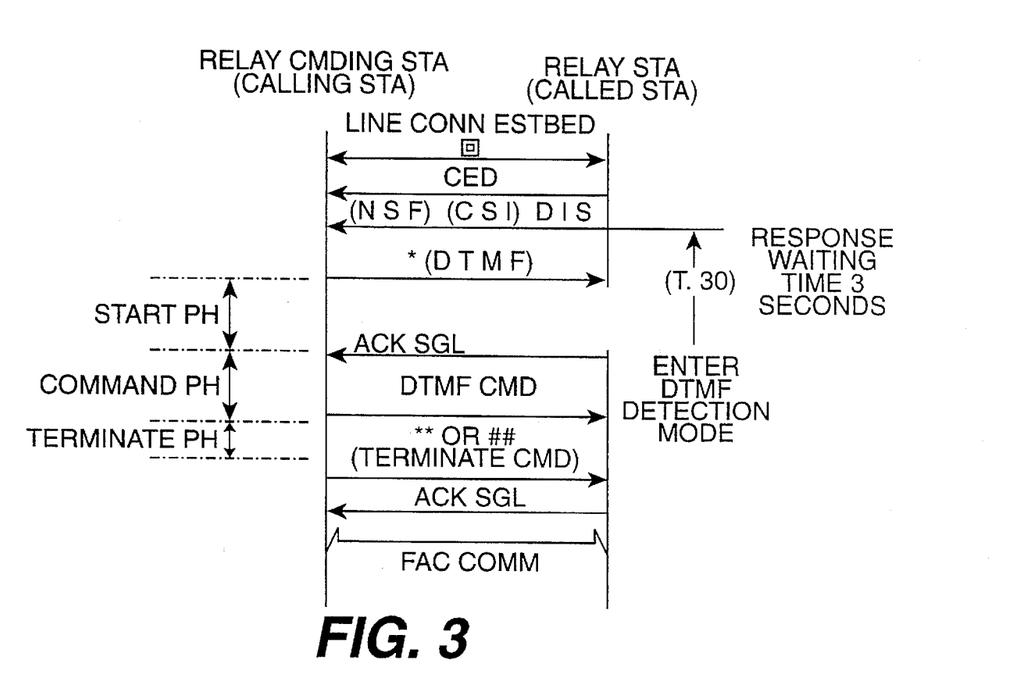
FIG. 3 is a sequence diagram showing the G3 protocol including the DTMF procedure.

The DTMF procedure will now be described. FIG. 3 is a procedural chart showing the G3 protocol including the DTMF procedure of a facsimile system. First, when the line connection is established upon calling from the calling station, a CED (Called Station Identification), an NSF (Non-Standard Facilities), a CSI (Called Subscriber Identification), and a DIS (Digital Identification Signal) are transmitted from the called station (NSF and CSI are optional). Then, the called station monitors both the facsimile signal and the DTMF signal for three seconds by regulation. Then, the facsimile apparatus on the transmitting side transmits the code for "*" in the DTMF signal. This code indicates that the transmitting side is transmitting the DTMF signal by automatic dialing. The facsimile apparatus on the receiving side, upon receipt of the code for "*", enters a DTMF detecting mode and sends back an acknowledgment signal at a predetermined frequency, for example 2100 Hz. The procedures up to this stage are called the start phase in the DTMF procedure.

The calling station transmits commands in the DTMF signal in accordance with a prescribed format and, at the end, transmits the code for "**" or "##" being predetermined terminating code. The procedures up to this stage are called the command phase in the DTMF procedure. The facsimile apparatus on the receiving side, when it has received the DTMF signal to the terminating code in the right format, sends back an acknowledgment signal at a predetermined frequency. The procedures up to this stage are called the terminate phase in the DTMF procedure. Thereafter, the G3 procedures are executed once again from the transmission of NSF/DIS signals and then training and transfer of picture information according to the normal G3 procedures are performed.

Figure 4:
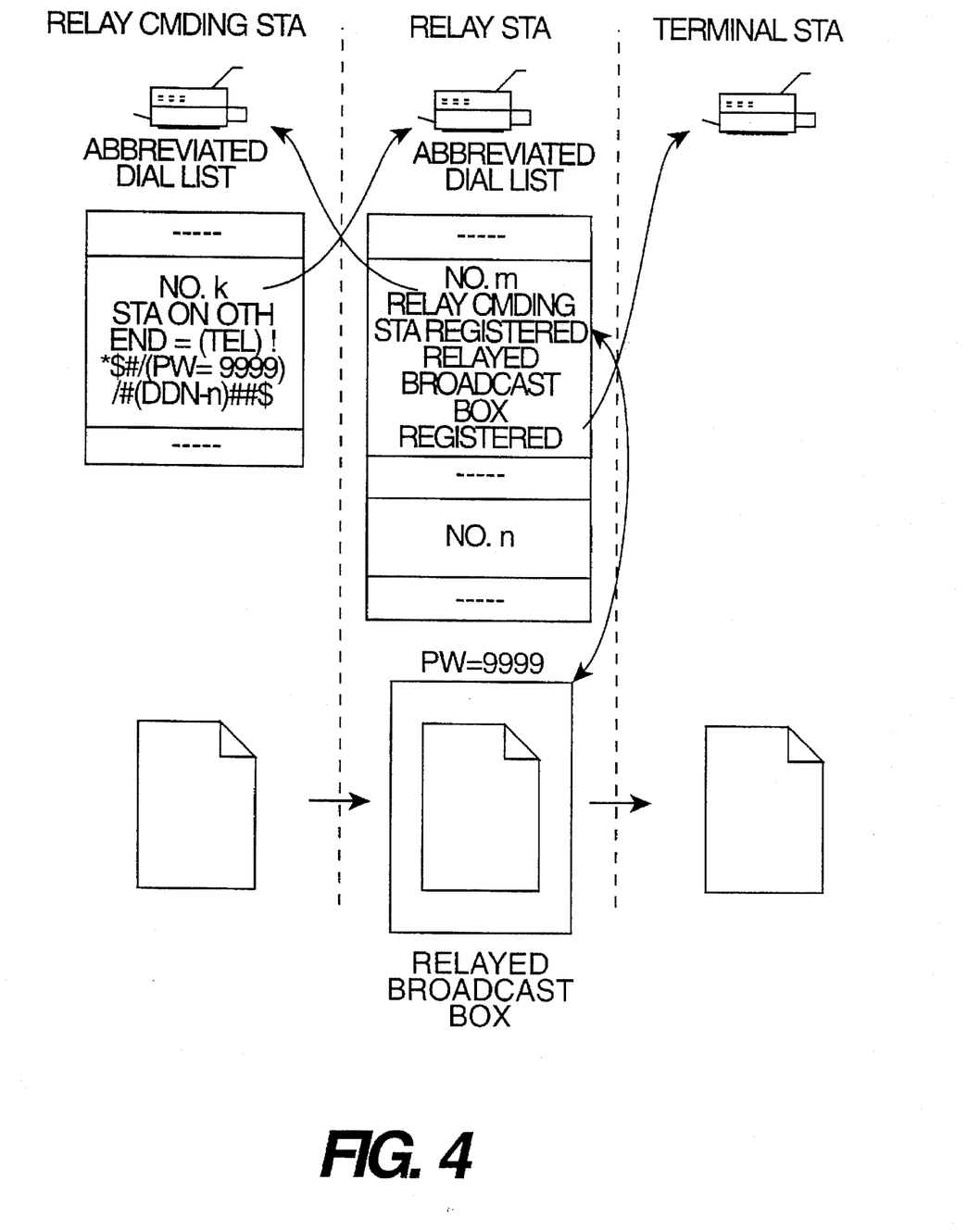
FIG. 4 is an explanatory drawing of relayed broadcast operation as an example of operations in an embodiment.

FIG. 4 is an explanatory drawing of a relayed broadcast operation as an example of the operations in the embodiment. First, a relay commanding station (calling station) writes the telephone number of a predetermined station on the other end of the line and relayed broadcast command codes according to the DTMF procedure into an optional abbreviated number area of its abbreviated dial list. In the figure, there are written such codes as "(TEL)!*$#/(PW=9999)/#(DDN=n)##$" in the abbreviated number area No. k. In the codes, "(TEL)" indicates the telephone number of the station on the other end of the line (relay station) and "!" is a code instructing the control means of its own station to start the DTMF procedure. The code "!" indicates that the code itself is not to be transmitted and the codes following it are to be transmitted after the (NSF), (CSI), and DIS signals have been received. The code "*", as described in FIG. 3, indicates to the receiver side that the transmitting side is transmitting the DTMF signal by automatic dialing.

The code "$" instructs the control means of its own station to transmit the following DTMF signal after receiving an acknowledgment tone signal from the station on the other end and this code is not transmitted. When there is no code following this code, the DTMF procedure is terminated and switched to the facsimile procedure. The code "#" punctuates a set of information. The code "/" forbids displaying on the panel or the like the codes placed between this code and the next code "/". The code "(PW=9999)" indicates that code (=9999) is the password. The code "(DDN=n)" indicates an abbreviated number (=n) and "##" indicates the end of the DTMF signal.

The relay station also makes registration in its abbreviated dial list. Namely, it registers, in the area of an abbreviated number m where the relay commanding station (calling station) is registered, the fact that the station is the relay commanding station and also registers a box for relayed broadcast. In the area of the abbreviated number n, there is registered the number of the terminal station as the destination of the broadcasting.

When an original document is set on the apparatus in the relay commanding station, an abbreviated number k is selected, and a command to start transmission is issued, the control unit first makes a call according to the telephone number of the station on the other end of the line by dialing, and when the connection has been established, it transmits the DTMF signal according to the procedures shown in FIG. 3. The relay station confirms that the station on the other end of the line is registered as the relay commanding station, and it, upon receipt of the DTMF signal, confirms the password at the command. If the password is identified, the relay station receives the original document and stores it into the box for relayed broadcast. Further, the same makes a call to establish connection with the terminal station having the indicated abbreviated number (=n) and, then, transfers thereto the original document stored in the box for relayed broadcast. Of course, it is possible to designate a plurality of destinations.

Figure 1:
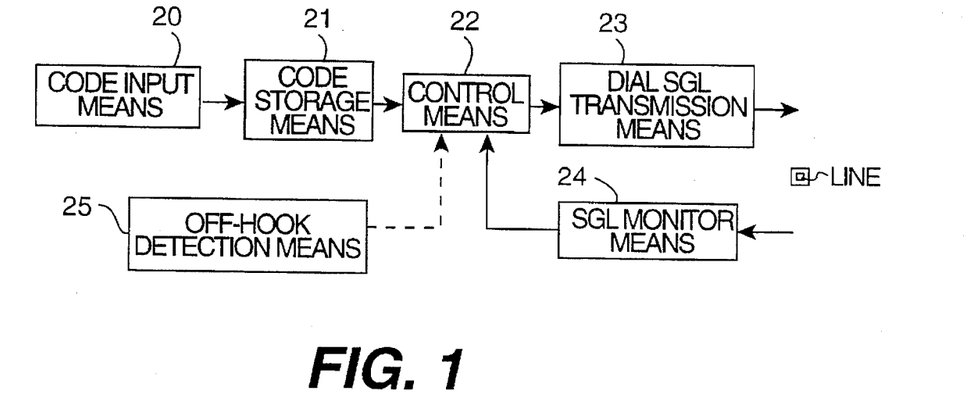
FIG. 1 is a functional block diagram showing function of a facsimile apparatus on the transmitting side executing DTMF procedures according to the invention.

FIG. 1 is a functional block diagram showing functions of a facsimile apparatus on the transmitting side carrying out the DTMF procedure to which the invention is applied. Code input means 20 is for example formed of a keyboard within the display console 3 and its control means, on which are provided keys (switches) for inputting numerals 0–9 necessary for dialing, codes corresponding to the characters necessary for controlling automatic dialing such as that for pause, and character codes (such as "!", "$", and "/") necessary for controlling the DTMF procedure. Code storage means 21 may for example be an abbreviated dial list provided within the RAM 2 backed up by a battery, and it stores a train of codes input from the code input means 20. Dial signal transmission means 23 is formed of the DTMF control unit 11 and the network control unit 12 and transmits the DTMF signal or DP (dial pulse) signal over the line according to the output of control means 22.

Signal monitor means 24 with modem 10 detects a facsimile signal and the DTMF control unit 11 detects the DTMF signal and the same detects the signals from the line and informs the control means 22 of the detected signals. Off-hook detection means 25 detects an off-hook condition of the handset. The control means 22 reads the codes from the code storage means 21 one by one and executes predetermined processing and control in accordance with the kind of code. The control means 22, while making a call, for example, keeps on outputting the read codes to the signal transmission means 23 until the code "!" is read and causes the same to transmit a DTMF (PB) signal or a DP signal according to the prescribed kind of the signal. The same, while carrying out the DTMF procedure, executes relevant control such as confirmation of a response signal according to the meaning of each control code. Further, the operations corresponding to the control codes may be changed when the off-hook condition is detected so that the system may be adapted also to manual operation.

Figure 5:
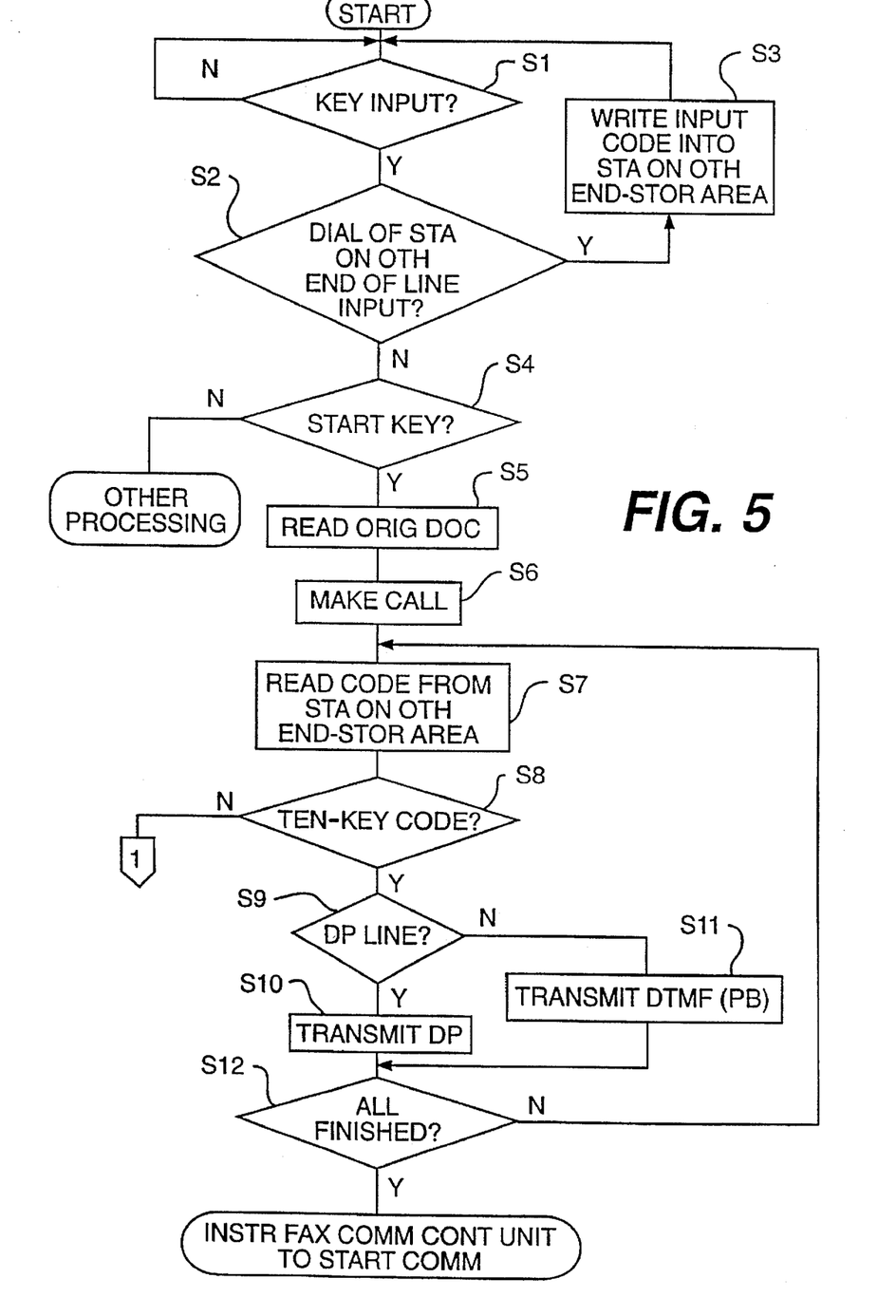
FIG. 5 is flowchart No. 1 showing DTMF processes performed on the transmitting side of the invention.
Figure 6:
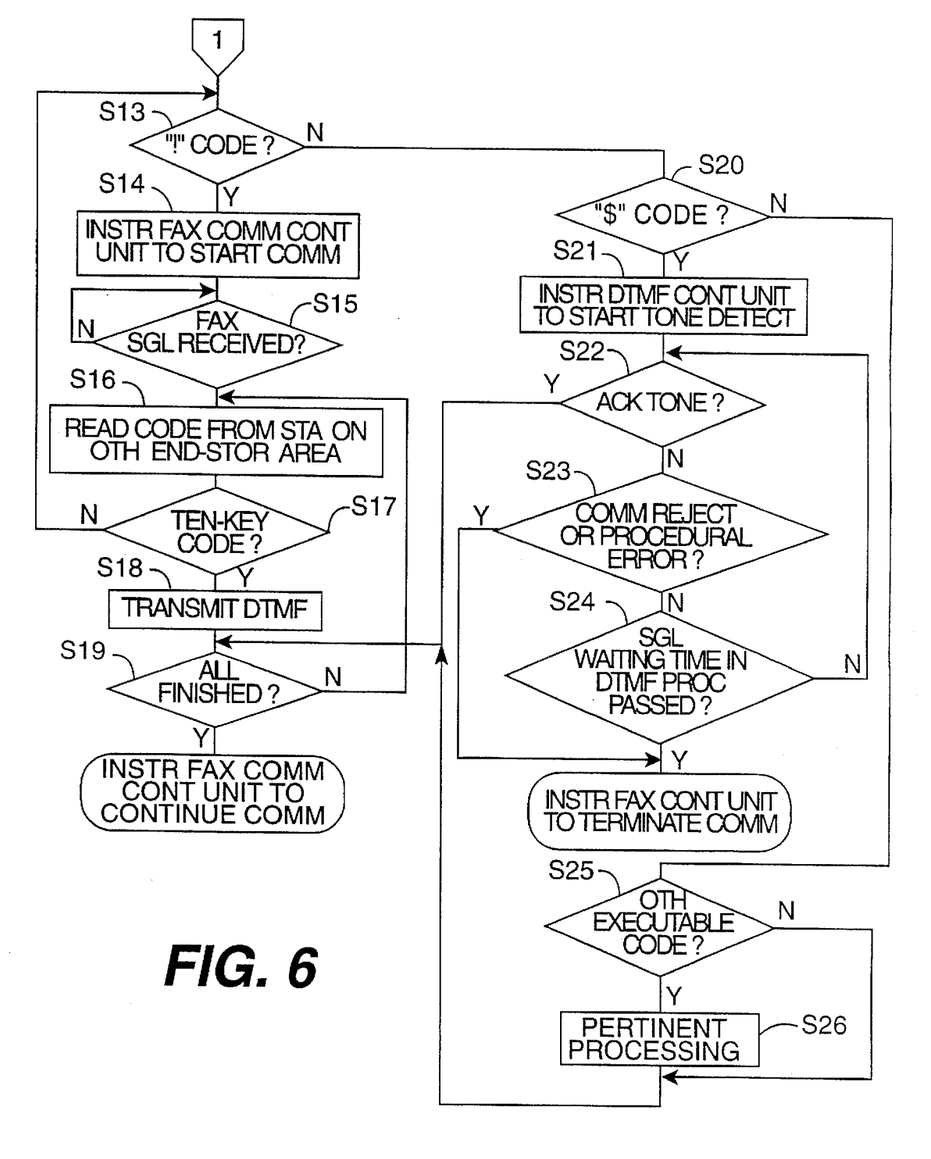
FIG. 6 is flowchart No. 2 showing DTMF processes performed on the transmitting side of the invention.

Details of operations performed on the transmitting side and receiving side in a facsimile system according to the invention will be described with reference to the accompanying flowcharts. FIGS. 5 and 6 are flowcharts showing operations in the DTMF procedure executed on the transmission side of the facsimile system according to this embodiment.

In FIG. 5, a key input from the panel is waited for in step S1 and, in step S2, it is determined whether the dialing code of a station on the other end of the line is input. When the result of the determination is positive, step S3 follows and therein the input code is written into a storage area of the station on the other end of the line (hereinafter briefly referred to as the station on the other end-storage area). In the case where the key for an abbreviated number has been pushed, the information of the number of the station on the other end stored in the abbreviated dial list is read and transferred to the station on the other end-storage area. In step S4, it is determined whether the start key has been pushed, and when the result is negative, other processing is made, but when the result is positive, step S5 follows and therein the original document is read by the reader 4 and put into storage. In step S6, the network control unit 12 is controlled such that the line is closed and a call is made.

In step S7, the CPU 1 reads codes in succession from the station on the other end-storage area within the RAM 2. In step S8, it is determined whether the read code is the ten-key code (dialing code). The ten-key code here includes numerals (0–9) and codes "*" and "#", which can be transmitted from an ordinary telephone set, and character codes for automatic dial controlling such as pause processing. When the result in step S8 is positive, step S9 follows and therein it is determined whether the kind of the dial signal of the line is the DP signal. When the result is positive, step S10 follows and therein a DP signal corresponding to the code is transmitted over the line. When the result of the determination in step S9 is negative, step S11 follows and therein a DTMF (PB) signal corresponding to the code is transmitted. In step S12, it is determined whether the reading of codes has completely been finished and, when the result is negative, the flow of processing returns to step S7, but when it is positive, the facsimile communication control unit 9 is instructed to start communication so that facsimile signaling procedure is started. When it is decided in step S8 that another code than the ten-key code has been read, step S12 in FIG. 6 follows.

In step S13 of FIG. 6, it is determined whether the read code is that for "!", and when the result is positive, step S14 follows. In step S14, the facsimile communication control unit 9 is instructed to start communication so that the facsimile signaling procedure is started. In step S15, reception of (NSF), (CSI), DIS signal is waited for as shown in FIG. 3. In step S16, a code is read from the station on the other end-storage area and, in step S17, it is determined whether the read code is the ten-key code. When the result of the determination is negative, the flow of processing returns to step S13, but when the result is positive, step S18 follows. In step S18, the DTMF signal corresponding to the code is transmitted over the line. In step S19, it is determined whether codes are all read, and when the result is negative, the flow of processing returns to step S16, but when the result is positive, the communication control unit 9 is instructed to continue the communication and the procedure according to the facsimile signal is started again.

When the result of the determination in step S13 is negative, step S20 follows, and therein it is determined whether the code is that for "$". When the result of the determination is positive, step S21 follows and therein the DTMF control unit 11 is instructed to start operation to detect an acknowledgment tone. In step S22, it is determined whether an acknowledgment tone has been detected, and when the result is positive, step S19 follows, but when the result is negative, step S23 follows. In step S23, it is determined whether a predetermined tone indicating rejection of command or procedural error has been received, and when the result is positive, the facsimile communication control unit 9 is instructed to terminate the communication, but when the result is negative, step S24 follows.

In step S24, it is determined whether the prescribed signal waiting time in the DTMF procedure has passed, and when the result is positive, the facsimile communication control unit 9 is instructed to terminate the communication, but when the result is negative, the flow of processing returns to step S22 to wait for the signal. When the result of the determination in step S20 is negative, step S25 follows and therein it is determined whether the code is another executable code (for example the pause code), and when the result is positive, pertinent processing is made in step S26. Through the execution of the above procedures, DTMF controlling by the dialing means is made possible by manually inputting dial codes including DTMF commanding codes or registering dial codes including DTMF commanding codes in the automatic dial list.

Figure 7:
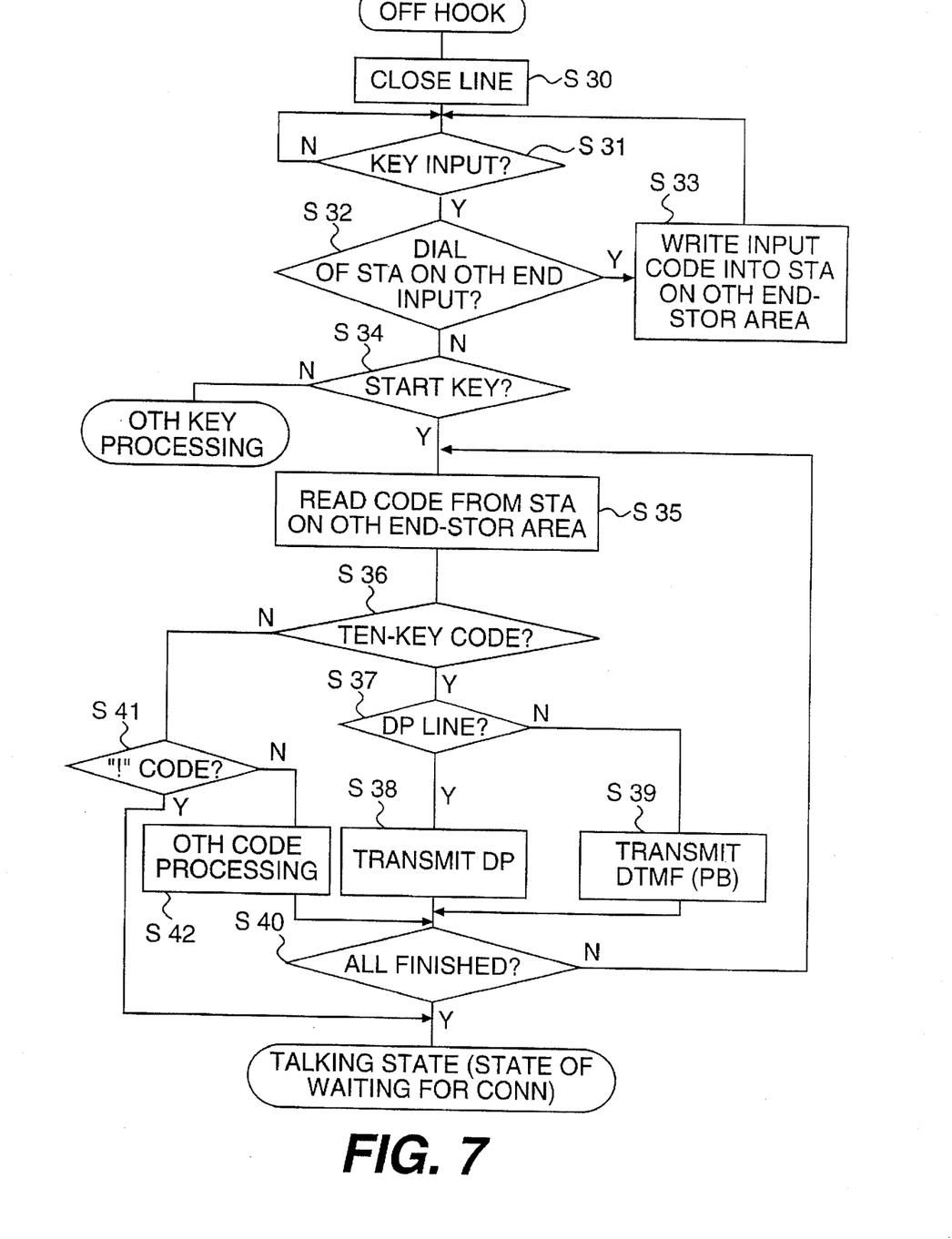
FIG. 7 is a flowchart showing processes performed on the transmitting side under the off-hook condition.

FIG. 7 is a flowchart showing processes performed in a facsimile apparatus on the transmitting side in the case where the invention is applied to operations under the off-hook condition. In step S30, first the line is closed and a call is made. In step S31, a key input is waited for and, in step S32, it is determined whether the dialing code of the station on the other end is input. When the result of the determination is positive, step S33 follows, and therein the input code is written into the station on the other end-storage area. In step S34, it is determined whether the start key has been pushed, and when the result is negative, other processing is made, but when the result is positive, step S35 follows, and in step S35, codes are successively read from the station on the other end-storage area. In step S36, it is determined whether the read code is the ten-key code, and when the result of the determination is positive, step S37 follows and therein it is determined whether the kind of the dial signal of the line is the DP. When the result is positive, step S38 follows and therein the DP signal corresponding to the code is transmitted over the line. When the result of the determination in step S37 is negative, step S39 follows and therein the DTMF (PB) signal corresponding to the code is transmitted.

In step S40, it is determined whether reading of codes are all finished and, when the result of the determination is negative, the flow of processing returns to step S35, but when it is positive, talking state (state of waiting for a connection) is brought about. When it is decided in step S36 that another code than the ten-key code has been read, step S41 follows. In step S41, it is determined whether the read code is that for "!", and when the result is negative, step S42 follows and therein processing corresponding to another code is made, but when the result is positive, talking state (state of waiting for a connection) is brought about. Through the execution of the above procedures, in making a call to the station on the other end of the line, for which are registered the DTMF procedural codes in the abbreviated dial list, for example, transmission of excessive signals or occurrence of malfunction can be prevented.

Figure 8:
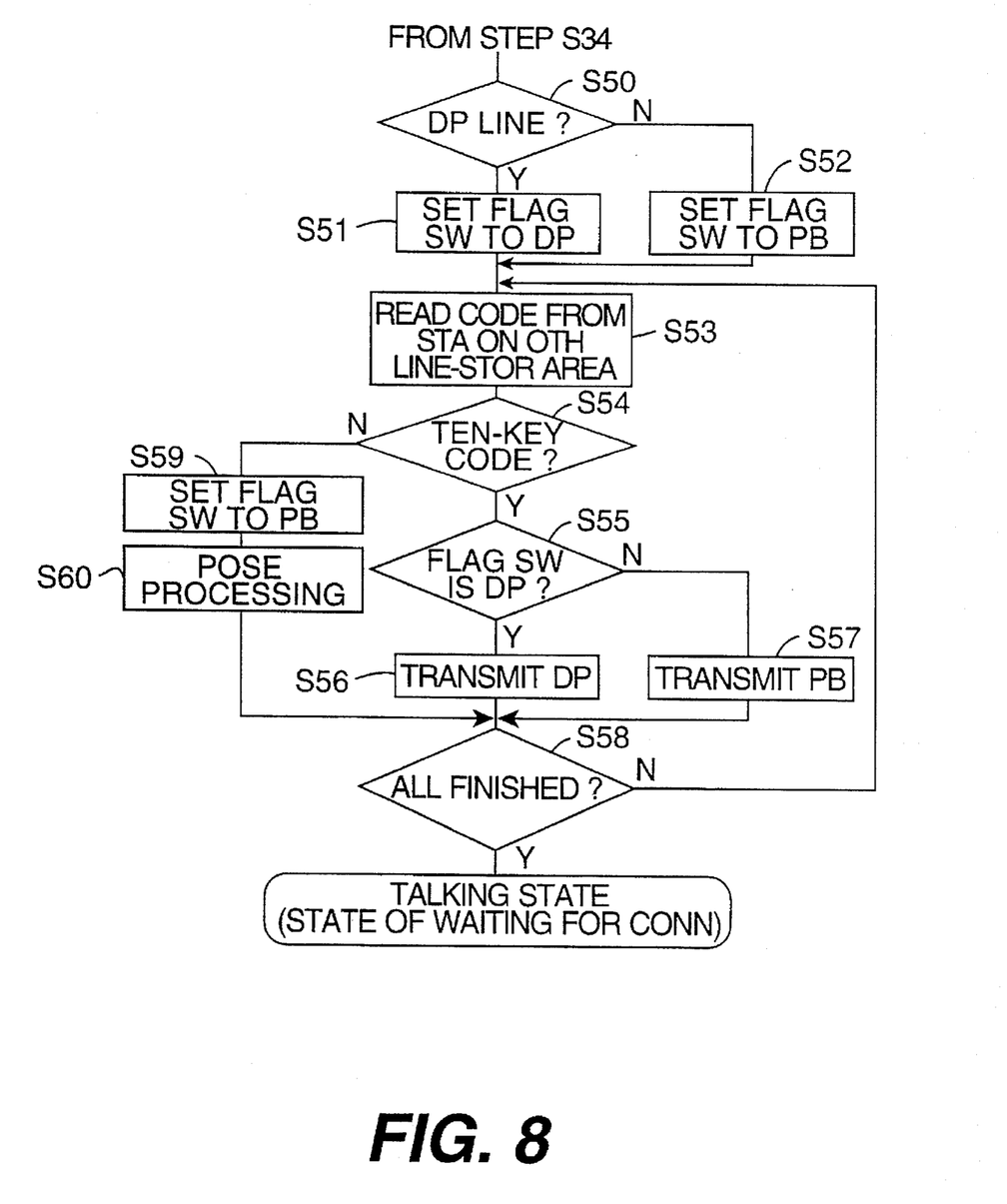
FIG. 8 is a flowchart showing a variation of the processes performed on the transmitting side under the off-hook condition.

FIG. 8 is a flowchart showing a variation of processes performed in a facsimile apparatus on the transmitting side in the case where the invention is applied to operations under the off-hook condition. In this embodiment, kinds of signals are controlled by using a flag called SW. Processing from step S30 to step S34 is the same as that in FIG. 7. Step S34 is followed by step S50, and therein it is determined whether the kind of the line is DP. The kind of line is preset, for example, from the panel. When the result is positive, step S51 follows and therein the flag SW is set to DP (for example, 0), and when the result is negative, step S52 follows and therein the SW is set to PB (for example, 1). In step S53, codes are successively read from the station on the other end-storage area. In step S54, it is determined whether the read code is the ten-key code. When the result of the determination is positive, step S55 follows and therein it is determined whether the flag SW is DP (0). When the result is positive, step S56 follows and therein the DP signal corresponding to the code is transmitted over the line. When the result of the determination in step S55 is negative, step S57 follows and therein the DTMF (PB) signal corresponding to the code is transmitted.

In step S58, it is determined whether reading of codes is completely finished, and when the result is negative, the flow of processing returns to step S53, but when it is positive, talking state (state of waiting for a connection) is brought about. When it is decided in step S54 that another code than the ten-key code has been read, step S59 follows. In step S59, the flag SW is set to PB (1), and in step S60, operation is stopped for a predetermined period of time and then step S58 follows. Through the execution of the above procedures, by having the DTMF control codes registered in the abbreviated dial list, for example, automatic transmission of the DTMF signal is made possible at the timing of the response coming from the terminal on the other end of the line and various remote controlling operations and reception of voice mail and the like can be automatically carried out.

Figure 9:
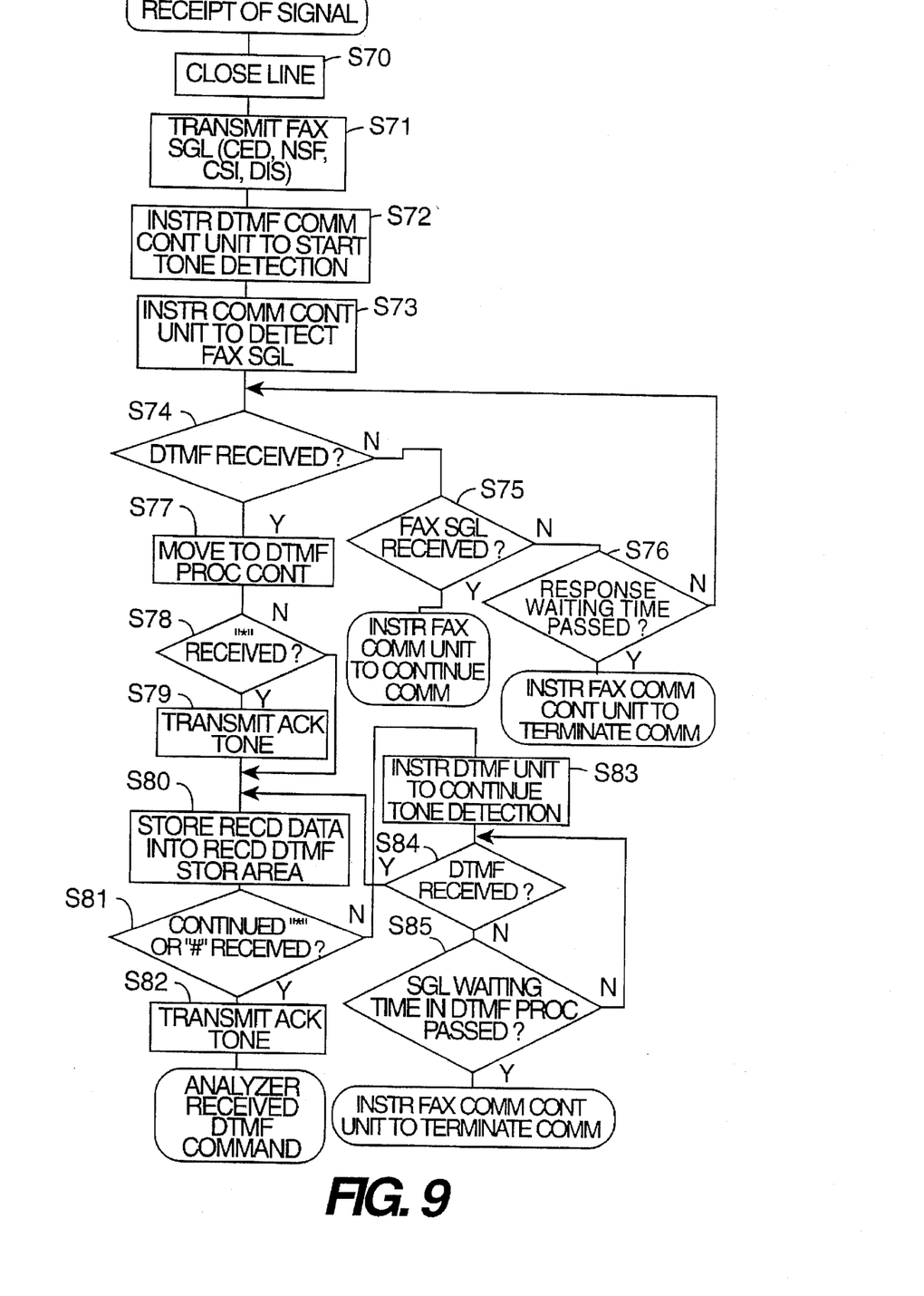
FIG. 9 is a flowchart showing processes performed on the receiving side of a facsimile system equipped with a control function according to the DTMF procedure.

FIG. 9 is a flowchart showing operations performed in a facsimile apparatus on the receiving side equipped with a control function in accordance with the DTMF procedure. When a signal reception has been made by the facsimile apparatus, it closes the line and responds to it in step S70. In step S71, the CED, (NSF), (CSI), and DIS signals are transmitted according to normal procedures. In step S72, the DTMF control unit 11 is instructed to start the tone detecting operation. In step S73, the communication control unit 9 is instructed to detect a facsimile control signal. In step S74, it is determined whether the DTMF signal has been received. When the result is positive, step S77 follows, but when it is negative, step S75 follows. In step S75, it is determined whether the facsimile control signal has been received. When the result is positive, the communication control unit 9 is instructed to continue the communication and execute normal procedures. When the result of the determination in step S75 is negative, step S76 follows and therein it is determined whether the prescribed waiting time for a response has passed. When the result of the determination is negative, the flow of processing returns to step S74, but when it is positive, the facsimile communication control unit 9 is instructed to terminate the communication so that the line is opened.

In step S77, the processing moves to the DTMF procedure control and, in step S78, it is determined whether the code for "*" has been received. When the result of the determination is positive, step S79 follows and therein an acknowledgment tone signal at 2100 Hz, for example, is transmitted. In step S80, the received data is stored into the received DTMF storage area (buffer). In step S81, it is determined whether continued codes of "*" or "#" indicating the end of the DTMF procedure have been received and, when the result is positive, step S82 follows and therein an acknowledgment tone signal is transmitted. Then, a command analyzing process of the received DTMF signal is performed and subsequent processing (for example, relayed broadcast) is made.

When the result of the determination in step S81 is negative, step S83 follows and therein the DTMF control unit is instructed to continue the tone detection. In step S84, it is determined whether a DTMF signal has been received and, when the result is positive, step S80 follows, but when it is negative, step S85 follows. In step S85, it is determined whether the prescribed signal waiting time in the DTMF procedure has passed. When the result is negative, the flow of processing returns to step S84, but when the result is positive, the communication control unit 9 is instructed to terminate the communication so that the line is opened. Through the execution of the above procedures, proper operations can be performed in the facsimile apparatus on the receiving side when the DTMF signal procedures are carried out. The processing may be modified such that an acknowledgment tone signal is transmitted also when the code for "*" is received during the course of the DTMF procedures.

Figure 10:
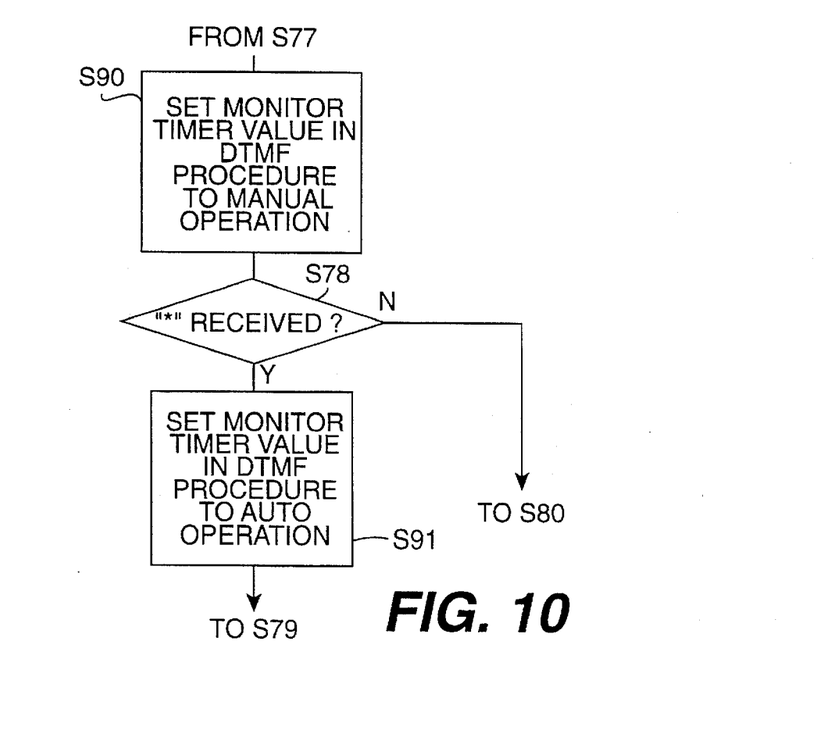
FIG. 10 is a flowchart showing a variation of the processes performed on the receiving side of the facsimile system.

FIG. 10 is a flowchart showing a main portion of a variation of the processes performed in the facsimile apparatus on the receiving side shown in FIG. 9. The variation is such that has processes in steps S90 and S91 added to the processes in FIG. 9. In step S90, which follows step S77 in FIG. 9, the monitored timer value according to the DTMF procedure, which is to be monitored in step S85 of FIG. 9, is set to a relatively larger value for use in manual processing. In the following step S78, it is determined whether the code for "*" has been received and, when the result is positive, step S91 follows. In step S91, the monitored timer value according to the DTMF procedure is set to a relatively smaller value for use in automatic processing. Since, as described above, the code for "*" received first indicates that the DTMF transmission from the transmitting side is being made by automatic dialing, the timer value can thus be controlled to have a suitable value according to receipt or nonreceipt of the code.

While the embodiment of the invention has been described above, variations mentioned below can also be made in the invention. In the above embodiment, there has been disclosed the case in which the code for "*" is transmitted at the beginning of the DTMF procedure to inform the receiving side of the fact that the transmitting side is using automatic dialing, but the transmission of the code for "*" may be omitted. While the case where "!" and "$" are used as control codes in the DTMF procedure has been disclosed above, the kinds of the codes are optional. Function designated in the DTMF procedure is optional and even confidential transmission, confidential polling, and the like are possible. DTMF control can be executed in the processes under the off-hook condition by using the function to receive various signals from the apparatus on the other end of the line like the processing in FIG. 5 and FIG. 6.

According to the first aspect of the invention, the control means, when it has read a predetermined code from the code storage means, waits transmission of signals following the predetermined code until a predetermined signal is received from the apparatus on the other end of the line, and, therefore, it is made possible to synchronize the transmission timing of a train of codes with operations in the apparatus on the other end, and further it is made possible to determine whether the apparatus on the other end is receiving the transmitted signal correctly according to receipt or nonreceipt of the signal from the apparatus on the other end. Accordingly, signals can be transmitted automatically and certainly. According to the second aspect of the invention, signals are first transmitted over the line in accordance with the kind of the dial signal designated by the kind-of-line designation means and, after the predetermined code has been read, signals are transmitted in the form of a multifrequency signal, and, therefore, automatic dialing and successive transmission of the multifrequency signal over the line supporting dial signaling, in any of such signals as DP, PB, and digital signals, can be executed continuously with the same apparatus. Accordingly, the user can successively carry out dialing and transmission of the multifrequency signal only by making one operation and thus usability of the apparatus can be improved. According to the third aspect of the invention, the control means, when an off-hook condition has been detected, neglects the codes following the predetermined code and performs no operation and, therefore, transmission of unnecessary signals under the off-hook condition can be prevented and occurrence of malfunction and production of noise can be checked. According to the fourth aspect of the invention, the control means, when a predetermined code is read under the off-hook condition, executes control such that the signal transmission means sends the following signal after waiting a predetermined period of time, and, therefore, signal transmission is made possible even under the off-hook condition.

What is claimed is:

1. A facsimile apparatus comprising:

code input means for inputting dialing codes and predetermined codes other than dialing codes;

code storage means for storing an input train of codes;

signal monitor means for monitoring signals received from a telephone line connected to a transmitting facsimile apparatus for a predetermined signal;

control means for reading a code from said code storage means, said control means includes first means for outputting said code and entering a wait state when said code is other than a first predetermined code; and second means for outputting a signal corresponding to said first predetermined code when said signal monitor means detects a predetermined signal from said transmitting facsimile apparatus; and signal transmission means for transmitting signals over said telephone line according to output codes from said control means.

2. A facsimile apparatus according to claim 1, further comprising kind-of-line designation means for designating the kind of line dial signal, wherein said signal transmission means includes first means for transmitting signals in the signal form designated by said kind-of-line designation means until a second predetermined code is read, and second signal transmission means for transmitting signals in a multifrequency signal form after reading the second predetermined code.

3. A facsimile apparatus according to claim 1 or 2, further comprising off-hook detection means for detecting an off-hook condition, and wherein said control means includes means for entering a wait state when said off-hook detection means detects an off-hook condition.

4. A facsimile apparatus according to claim 1 or 2, further comprising off-hook detection means for detecting an off-hook condition, and wherein said control means includes means for interrupting signal transmission for a predetermined period of time, when said off-hook detection means detects an off-hook condition.

5. A facsimile apparatus comprising:

code input means for inputting dial codes and predetermined codes other than dial codes;

code storage means for storing an input train of codes;

signal monitor means for monitoring signals received from a telephone line connected to a transmitting facsimile apparatus for a predetermined signal;

control means for reading said train of codes from said code storage means into said signal monitor means, said control means including first means for outputting said read train of codes when a code signal other than a first predetermined code signal is received from said transmitting facsimile apparatus, and second means for outputting a second predetermined code signal corresponding to said read train of codes when said first predetermined code signal is received from said transmitting facsimile apparatus; and signal transmission means for transmitting signals over said telephone line according to the output code signals from said control means.

* * * * *